United States Patent
Draese et al.

(10) Patent No.: US 12,076,669 B2
(45) Date of Patent: Sep. 3, 2024

(54) PROCESSING OF FILTERED ROLLING OIL AND FILTERING AGENTS

(71) Applicants: Stephan Draese, Nettetal (DE); Olaf Güßgen, Cologne (DE); Oliver Seiferth, Cologne (DE)

(72) Inventors: Stephan Draese, Nettetal (DE); Olaf Güßgen, Cologne (DE); Oliver Seiferth, Cologne (DE)

(73) Assignee: Hydro Aluminum Rolled Products GmbH, Grevenbroich (DE)

( * ) Notice: Subject to any disclaimer, the term of this patent is extended or adjusted under 35 U.S.C. 154(b) by 560 days.

(21) Appl. No.: 16/851,494

(22) Filed: Apr. 17, 2020

(65) Prior Publication Data

US 2020/0238195 A1   Jul. 30, 2020

Related U.S. Application Data

(63) Continuation of application No. PCT/EP2018/077917, filed on Oct. 12, 2018.

(30) Foreign Application Priority Data

Oct. 17, 2017  (EP) .................................. 17196872

(51) Int. Cl.
| | |
|---|---|
| B01D 3/10 | (2006.01) |
| B01D 5/00 | (2006.01) |
| B01D 37/02 | (2006.01) |
| C02F 1/00 | (2023.01) |
| C02F 1/28 | (2023.01) |
| C10M 175/00 | (2006.01) |

(52) U.S. Cl.
CPC ............... *B01D 3/10* (2013.01); *B01D 5/006* (2013.01); *B01D 37/02* (2013.01); *C02F 1/001* (2013.01); *C02F 1/28* (2013.01); *C10M 175/0033* (2013.01)

(58) Field of Classification Search
CPC ... B01D 1/18; B01D 3/02; B01D 3/10; B01D 5/0045; B01D 5/006; B01D 37/02; B01J 20/34; C10M 175/0025; C10M 175/0033
See application file for complete search history.

(56) References Cited

U.S. PATENT DOCUMENTS

| | | | |
|---|---|---|---|
| 4,230,557 A | 10/1980 | Bertelsen et al. | |
| 2004/0173505 A1 | 9/2004 | Fakhri | |
| 2005/0005772 A1 | 1/2005 | Spani | |
| 2005/0051502 A1* | 3/2005 | Gottkehaskamp | B01D 29/74 |
| | | | 210/777 |
| 2011/0230377 A1 | 9/2011 | Seiferth et al. | |
| 2012/0184787 A1* | 7/2012 | Miller | C10M 175/0025 |
| | | | 585/1 |
| 2015/0001062 A1* | 1/2015 | Draese | C10M 169/04 |
| | | | 203/89 |

FOREIGN PATENT DOCUMENTS

| | | | |
|---|---|---|---|
| CN | 101775330 A | 7/2010 | |
| CN | 102303035 A | 1/2012 | |
| CN | 102847733 A | 1/2013 | |
| CN | 202961912 U | 6/2013 | |
| CN | 103396876 A | 11/2013 | |
| CN | 105087131 A | 11/2015 | |
| CN | 204952318 U | 1/2016 | |
| CN | 106010767 A  * | 10/2016 | ........ C10M 75/0033 |
| CN | 106147978 A | 11/2016 | |
| CN | 205699520 U | 11/2016 | |
| CN | 107723098 A | 2/2018 | |
| DE | 42 00 670 A1 | 7/1993 | |
| DE | 199 44 624 A1 | 3/2001 | |
| DE | 102014217226 A1 | 3/2016 | |
| EP | 1 028 157 A1 | 8/2000 | |
| EP | 1622994 A1 | 2/2006 | |
| EP | 2499224 A4 | 5/2014 | |
| GB | 412664 A | 7/1934 | |
| GB | 1331056 A | 9/1973 | |
| GB | 2099847 A | 12/1982 | |
| GB | 2263283 A  * | 7/1993 | ........... B01D 5/0096 |
| JP | S56127683 A | 10/1981 | |
| KR | 100521420 B1 | 10/2005 | |
| WO | WO 2013/107768 A2 | 7/2013 | |

OTHER PUBLICATIONS

CN106010767A—EPO Machine Translation. (Year: 2021).*
Northeast Institute of Technology, "Rare Earth Metallurgy", Metallurgical Industry Press, Nov. 30, 1981, pp. 135-136.
Teaching & Research Section of Environment Engineering, Department of Chemical Engineering, Xiangtan University, "Industrial Wastewater Treatment Engineering", Xiangtan University Press, Oct. 31, 1983, vol. 1, p. 237.
Wu, B., "Recycling of Waste Rolling Oil by Molecular Distillation Technology", *Aluminium Fabrication* (Periodical), No. 3, 2008, pp. 33-35.
Gutiérrez et al., "Treatment of a waste oil-in-water emulsion from a copper-rolling process by ultrafiltration and vacuum evaporation", Journal of Hazardous Materials (Journal), vol. 185, No. 2-3, 2011, pp. 1569-1574 https://doi.org/10.1016/j.jbazmat.2010.10.088.

* cited by examiner

*Primary Examiner* — Patrick Orme
(74) *Attorney, Agent, or Firm* — Reinhart Boerner Van Deuren P.C.

(57) ABSTRACT

Disclosed is a method for the recovery of filtering agents and rolling oil from a mixture containing used rolling oil and filtering agents coated with used rolling oil in which the mixture containing rolling oil and filtering agents is subjected to vacuum distillation under agitation in a reactor equipped with an agitator and vapour precipitator. The vacuum during distillation is regulated with an inert gas flow, the rolling oil is condensed and collected, and a rolling oil which can be reused for rolling and a powder filtering agent which can be reused are obtained.

13 Claims, No Drawings

PROCESSING OF FILTERED ROLLING OIL AND FILTERING AGENTS

CROSS-REFERENCE TO RELATED PATENT APPLICATIONS

This patent application is a continuation of International Patent Application No. PCT/EP2018/077917, filed Oct. 12, 2018, which claims the benefit of European Patent Application No. 17196872.0, filed Oct. 17, 2017, the entire teachings and disclosure of which are incorporated herein by reference thereto.

TECHNICAL FIELD OF THE INVENTION

The invention relates to a method for recovering rolling oil and filter aids from filter aids used for the filtration of rolling oil. The filter aid thus recovered can—after optional washing—be reused for purifying rolling oil or directly as an adsorbent and precoating deposit. The recovered oil can be reused in the rolling process.

BACKGROUND OF THE INVENTION

So-called rolling oils are often used as cooling lubricants during reducing cold rolling, re-rolling and also during stamping and texturing passes in cold rolling mills for metallic workpieces. These rolling oils are complex hydrocarbon mixtures with additives and are used in the rolling process for lubrication, cooling and cleaning. They therefore have a major impact on the economic efficiency of production and the quality of the products manufactured by rolling.

Rolling oils are usually used in cold rolling mills in circulation systems consisting of a pure oil tank, feed pumps, oil distribution system, sump, waste oil tank, filtration system, cooling and pure oil tank. Rolling oil is continuously supplied to the deformation zone or stamping zone. Impurities are continuously removed by filtration and heat is continuously extracted in the cooling system. The impurities in question are mainly abrasion and metallic soaps.

The filtration of the rolling oils is of particular importance, as their continuity and function have a decisive influence on the productivity of the process and the quality of the product. Filtration of the rolling oils is carried out, for example, by the so-called precoat filtration process with horizontal plate pressure filters or by means of back-flushing filters. The filter aids used in the process include, for instance, perlite, diatomaceous earth (kieselguhr), bleaching earth or mixtures thereof. During filtration, the rolling abrasion is mechanically deposited in the filter cake formed from filter aids and metallic soaps are removed by chemically active components. At the same time, however, larger quantities of rolling oil are also bound in the filter cake. Typical filter cake waste from horizontal plate pressure filters contains approximately 1% metal abrasion and approximately 40% rolling oil.

As far as disposal is concerned, the filter earths that contain rolling oil have so far been treated as waste and sent for thermal recycling. The choice in favor of this form of disposal is evident, as the filter cake that contains rolling oil has a high calorific value and burns very well. Furthermore, the waste gases resulting from the combustion of the filter cake that contains rolling oil are easy to purify. For these reasons, the thermal utilization of this waste material was a logical choice.

The disadvantage of this commonly practiced procedure is that a large amount of oil or cooling lubricant is discharged by filtration aids and both oil and filter aids are ultimately lost due to combustion. Furthermore, the used filter aids are also responsible for generating large quantities of waste on the whole. This also applies to filtration or purification of the contaminated oil by means of back-flushing filters. This commonly practiced procedure of incineration is thus also associated with high $CO_2$ emissions. With ever fewer primary sources of rolling oil, rolling oil is becoming increasingly valuable and rolling oil prices have increased significantly in recent years.

Hypothetically, it is also conceivable to exclusively implement distillation techniques to separate the oil from the solids. This, however, involves high investment costs and high energy consumption. The thermal stress of the rolling oil during distillation can lead to a degradation in quality, as cracked products can form in the oil. A suitable system has never been put into operation. Centrifugal separation processes have an insufficient particle separation rate for small particle diameters and therefore do not appear suitable for separating contaminating solids from the rolling oil.

DE 42 00 670 A1 describes a process for the disposal of filter cakes that contain oil and that result from the mechanical filtration of rolling oil and recommends vacuum drying of the filter cake to evaporate and concentrate the rolling oil. The filter cake should contain non-ferrous metals. Which non-ferrous metals are involved is not specified. The procedure described is, however, not suitable for filter cakes containing aluminium or magnesium, as both metals are combustible and explosions would occur spontaneously when implementing the described procedure, especially at temperatures of or in excess of 140° C.

BRIEF SUMMARY

For both commercial and ecological reasons, there is a great need to provide a process for the treatment of filter aids contaminated with rolling oil. The process should not only provide rolling oil in a suitable quality for immediate reuse but also make it possible to reuse the used filter aid.

The object of the invention is therefore to provide a process for recovering oil and filter aids from the filter aids contaminated with rolling oil. Products of the process should be a reusable rolling oil and a reusable filter aid.

This objective is achieved by a process for evaporating the oil-containing source material under vacuum. Consequently, the recovery of rolling oil from filter aids used for the filtration of rolling oil is achieved by vacuum distillation (vacuum evaporation) whereby the used filter aid that contains rolling oil is stirred in a reactor equipped with an agitator and vapor filter in order to separate the rolling oil and filter aid, whereby an inert gas flow controls the vacuum during distillation, and whereby the rolling oil separated by distillation from the filter aid and aluminium particles is recyclable for use in rolling processes and a pulverized recyclable filter aid is obtained.

The method according to the invention is absolutely safe and leads to a significant reduction in the fresh oil requirement of a rolling mill and consequently also to a reduction in the operating costs for industrial mill production. The recycling of the de-oiled filter aid and the rolling oil obtained also helps protect natural resources. There is no cause for concern of any contamination due to cracked products.

DETAILED DESCRIPTION OF PREFERRED EMBODIMENTS

The method according to the invention is a vacuum-thermal recovery of filter aid and rolling oil from filter aids (filter earths) contaminated with used rolling oil. The method according to the invention allows for the conversion of the used filter aid as a waste material into a feed material that is suitable for use in further industrial processes. Overall, much less waste is generated as a result.

The de-oiled filter aid can thus be used as an adsorbent or as a filtration aid, for example, in industrial wastewater treatment or can be reused in the process according to the invention. The method according to the invention leads to a significant reduction in purchases of fresh rolling oil in the metal foil and metal strip manufacturing industry and simultaneously also implies a considerable reduction in the use of natural resources. Finally, the method according to the invention leads to a significant reduction of carbon dioxide emissions in industrial rolling mills because used rolling oil is no longer disposed of for incineration. In other words, it can be called a sustainable process.

Surprisingly, it was found that vacuum drying or vacuum distillation allows up to 99% by weight of the rolling oil to be recycled from the filter cake and provides the product in a quality suitable for direct reuse as rolling oil. For purposes of describing this invention, the terms vacuum drying and vacuum distillation have the same meaning. It is also surprising that, following removal of the rolling oil, the filter aid is obtained in a recyclable quality and can be reused for its original purpose after an alkaline or mineral acid washing and subsequent drying.

The source material for the separation of the rolling oil from the filter aid by distillation is a paste-like and/or compact mass containing filter aids, metal abrasion and rolling oil. This mass was separated from the filter fleece material of the filtration unit. The rolling oil content of the source material may be in the range from 30% to 70% by weight, 35% to 60% by weight or 35% to 45% by weight, relative in each case to the weight of the source material. The filter aid content in the source material according to the method of the invention may be in the range from 30% to 70% by weight, 40% to 65% by weight or 55% to 65% by weight, relative in each case to the weight of the source material. The source material of the vacuum distillation may further contain 0.2% by weight or 0.8% by weight to 5% by weight of metal abrasion debris, relative to its weight. Depending on the element and its classification in the electrochemical series, this material obtained after the separation of the rolling oil by distillation is to be regarded as combustible. It can therefore have a spontaneous and highly exothermic reaction with atmospheric oxygen, air humidity or other compounds.

In filtration equipment for purifying rolling oil, conventional filter earths are used as filter aids. These filter aids or filter earths include, for example, perlite, bleaching earth, diatomaceous earth (kieselguhr), cellulose, coal, other inorganic filter aids known to the specialist, as well as mixtures of these filter aids.

In addition to a lubricating oil with, for example, 10 to 50 carbon atoms, the rolling oil may contain lubricating fatty acids, lubricating esters of fatty acids and dicarboxylic acids and lubricating fatty alcohols. Lubricant oils are, for example, mineral oils, vegetable oils or synthetically produced oils. Rolling oils may also contain various additives such as surfactants, corrosion inhibitors, extreme-pressure additives and non-ferrous metal corrosion inhibitors.

Distillation is carried out such that the reactor is charged throughout the distillation process with inert gas while being fed with the filter aid containing the contaminated oil. Nitrogen is preferably used as an inert gas. Depending on the requirements and the size of the reactor, other suitable inert gases such as helium, argon or perfluorocarbons (PFCs) may also be used. Preferably, inert gas is also used for setting the negative pressure. The negative pressure to be set in the method according to the invention can be 0 mbar to 20 mbar, preferably 10 mbar to 16 mbar and particularly preferably approximately 14 mbar. Inert gas is thus used to regulate the negative pressure to be set according to the invention. The temperature in the reactor and especially in the sump of the reactor can be in the range of 60° C. to 300° C. Preferably, the temperature in the reactor and especially in the sump of the reactor is 60° C. to 200° C. or 60° C. to 150° C. The selected temperature in the reactor depends on the boiling point of the components of the rolling oil. Under the above-mentioned conditions, the rolling oil is converted to the gaseous state. The rolling oil is collected after it condenses on a condenser. The filter aid that is separated from the rolling oil and is in powder form remains in the reactor and is subsequently removed from it.

A reactor for implementing the method according to the invention comprises an agitator that is suitable for stirring paste-like masses. To avoid partial overheating of the paste-like mass consisting of the filter aid, metal abrasion and rolling oil, an agitator is required which also gathers a paste-like mass in the area of the reactor wall and the reactor base and keeps the paste-like mass in motion in the reactor. This agitator preferably also has a slitting or sickle blade design for cutting the contents. The agitator blades are preferably heatable. The agitator can have the shape of an anchor. Preferably, the agitator design should also facilitate the heating of stagnant dead volumes such as stuffing boxes and vapor tubes in the reactor. The dead volume in the reactor should be kept as low as possible. A vacuum agitator dryer, for example, can be used to evaporate the rolling oil from the filter aid. Anchor or paddle agitators can be used to continuously mix the paste-like source material. The distillation reactor is therefore designed to ensure that the paste-like mass is heated uniformly and without heat accumulation or partial overheating in order to minimize the formation of cracked products during distillation. The vapor filter should preferably be cleaned by blowing in air or water.

The equipment for implementing the method according to the invention may comprise a feed tank, an agitator drive, a wall heating coil and a heatable double bottom, a discharge flap for the dried filter aid, a condenser and collection tanks for the recovered process products of the method according to the invention. The reactor has a system for applying a vacuum. The reactor is connected to or contains a condensing unit and can be cooled with a liquid.

The rolling oil is condensed at the head of the reactor. Particularly good results are achieved with a vapor filter which protects the condensate and the evaporation apparatus from contamination by dust particles. The quality of the distillate obtained makes it suitable for further use as rolling oil without any restrictions. Alternatively, a double-drum vacuum dryer can be used. Distillation must be performed under the exclusion of oxygen to a large extent in order to prevent exothermic, chemical reactions resulting from the presence of oxygen during distillation. Any apparatus which does not meet this requirement is unsafe and therefore not suitable for implementing the method according to the invention.

The de-oiled filter aid with any metal abrasion present is removed from the reactor sump. It is in the form of a fine-particulate powder which, depending on its composition, reacts with air and water. In order to reduce the reactivity and to improve the quality and usability, the powder obtained must directly undergo an alkaline wash with an aqueous alkaline solution or an acidic wash with an aqueous mineral acid, whereby a controlled chemical reaction of the reactive particles takes place and thus a harmless raw material, which is safe and inexpensive for use in further applications, is once again obtained from the filter earths.

The recovery of rolling oil from filter aids helps prevent large amounts of waste, as the filter aid that is obtained after the removal of the oil (the dried filter aid) no longer has to be disposed of for incineration. The areas of application for reprocessed filter aids are, for example, treatment and conditioning of industrial and municipal wastewater.

An example of an embodiment of the method according to the invention is described in the following. Used filter material contaminated with rolling oil is fed from a storage tank into the top opening of a reactor by a conveyor system. The reactor lies on load cells to determine the filling level of the reactor. The reactor has a working volume of 5 m$^3$. The moist feedstock, which is the source material of the method according to the invention, has a bulk density of approximately 0.5 kg/l. While the reactor is being fed with the used filter material, a light and constant flow of nitrogen is introduced into the reactor via a fine valve. While the reactor is being fed, the agitator in the reactor is run at a low speed to achieve a homogeneous mixture and allow the feedstock to settle in the reactor. Feeding is stopped if the filling quantity of the reactor reaches approximately 2,500 kg. The reactor is then shut. The vacuum pumps are switched on and a light nitrogen flow continues to flow into the reactor. The cooling and heating systems are also switched on. The reactor is evacuated to an internal pressure of 20 mbar. After an internal pressure of 50 mbar is attained, the flow of nitrogen can be reduced or stopped. The speed of the agitator is increased, whereby the reactor contents are heated.

In the course of distillation, the temperature of the reactor contents increases as does the head temperature (vapor temperature) in the reactor. Initially, water evaporates in the feed line. This water is the water of crystallization of the filter material and water that is present as an impurity in the filter material. Oil is partially entrained during the distillation of the water. The condensed flow is collected in the header tank by means of a valve switch.

The internal reactor temperature continues to rise, once the feedstock in the reactor is dehydrated. The head temperature in the vapor tube can intermittently drop again, as long as no component in the reactor has reached its boiling point. As the temperature in the reactor rises, the rolling oil begins to boil and distill. The condensed and recovered oil is directed to a storage tank. Distillation is continued up to a preset reactor and/or head temperature and then stopped. The temperature control of the reactor switches to cooling and the fine valve is opened to introduce nitrogen and gradually interrupt the negative pressure in the reactor. The vacuum pumps are regulated to reduce their output until the internal and external pressures of the reactor are equalized. An equalization valve and a small creeping volume from the nitrogen line ensure that no oxygen can be drawn from the surroundings into the reactor. The entire equipment system is cooled to a residual temperature of below 50° C. before it is opened and the filter material that is obtained following separation from the oil and that is present at the bottom of the reactor is removed from the reactor.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for the recovery of filter aids and rolling oil from a mixture containing used rolling oil and filter aids contaminated with used rolling oil, comprising the steps of:
    subjecting the mixture to vacuum distillation involving stirring in a reactor equipped with an agitator and vapor filter,
    controlling the vacuum during distillation through the flow of inert gas,
    condensing and collecting the rolling oil, whereby a recyclable rolling oil and a pulverized recyclable filter aid are obtained.

2. The method according to claim 1, wherein the filter aid separated from the rolling oil following vacuum distillation is washed with an aqueous alkaline liquid.

3. The method according to claim 1, wherein the filter aid separated from the rolling oil following vacuum distillation is washed with an aqueous mineral acid liquid.

4. The method according to claim 1, wherein the vacuum distillation of the rolling oil from the mixture of used rolling oil and used filter aid is performed at negative pressure at a temperature in the reactor of 60° ° C. to 200° ° C.

5. The method according to claim 1, wherein the vacuum distillation of the rolling oil from the mixture of used rolling oil and used filter aid is performed at negative pressure at a temperature in the reactor of 60° C. to 150° C.

6. The method according to claim 1, wherein the vacuum distillation is performed at a negative pressure of 0 mbar to 20 mbar.

7. The method according to claim 6, wherein the vacuum distillation is performed at a negative pressure of 10 mbar to 16 mbar.

8. The method according to claim 1, wherein the vapor filter, during vacuum distillation, keeps dust constituents away from a condensate and retains them in an evaporator section of the reactor.

9. The method according to claim 8, wherein the dust constituents include filter earth.

10. The method according to claim 8, wherein the dust constituents include aluminium.

11. The method according to claim 8, wherein the dust constituents include metal particles.

12. The method according to claim 1, wherein the reactor is under inert gas while the mixture is fed to the reactor.

13. Use of a filter aid that is has been used for purifying rolling oil and that has undergone vacuum distillation for separating the rolling oil according to claim 1, comprising the step of utilizing the filter aid as an adsorbent or filtration aid for treating industrial or municipal wastewater.

* * * * *

UNITED STATES PATENT AND TRADEMARK OFFICE
CERTIFICATE OF CORRECTION

PATENT NO. : 12,076,669 B2  
APPLICATION NO. : 16/851494  
DATED : September 3, 2024  
INVENTOR(S) : Stephan Draese et al.

Page 1 of 1

It is certified that error appears in the above-identified patent and that said Letters Patent is hereby corrected as shown below:

On the Title Page

Item (71) and Item (72):  
The City of Applicant/Inventor, Olaf Güßgen, delete:  
"Cologne"  
Replace with:  
--Köln--

Item (71) and Item (72):  
The City of Applicant/Inventor, Oliver Seiferth, delete:  
"Cologne"  
Replace with:  
--Köln--

Signed and Sealed this  
Fifteenth Day of April, 2025

Coke Morgan Stewart  
*Acting Director of the United States Patent and Trademark Office*